UNITED STATES PATENT OFFICE.

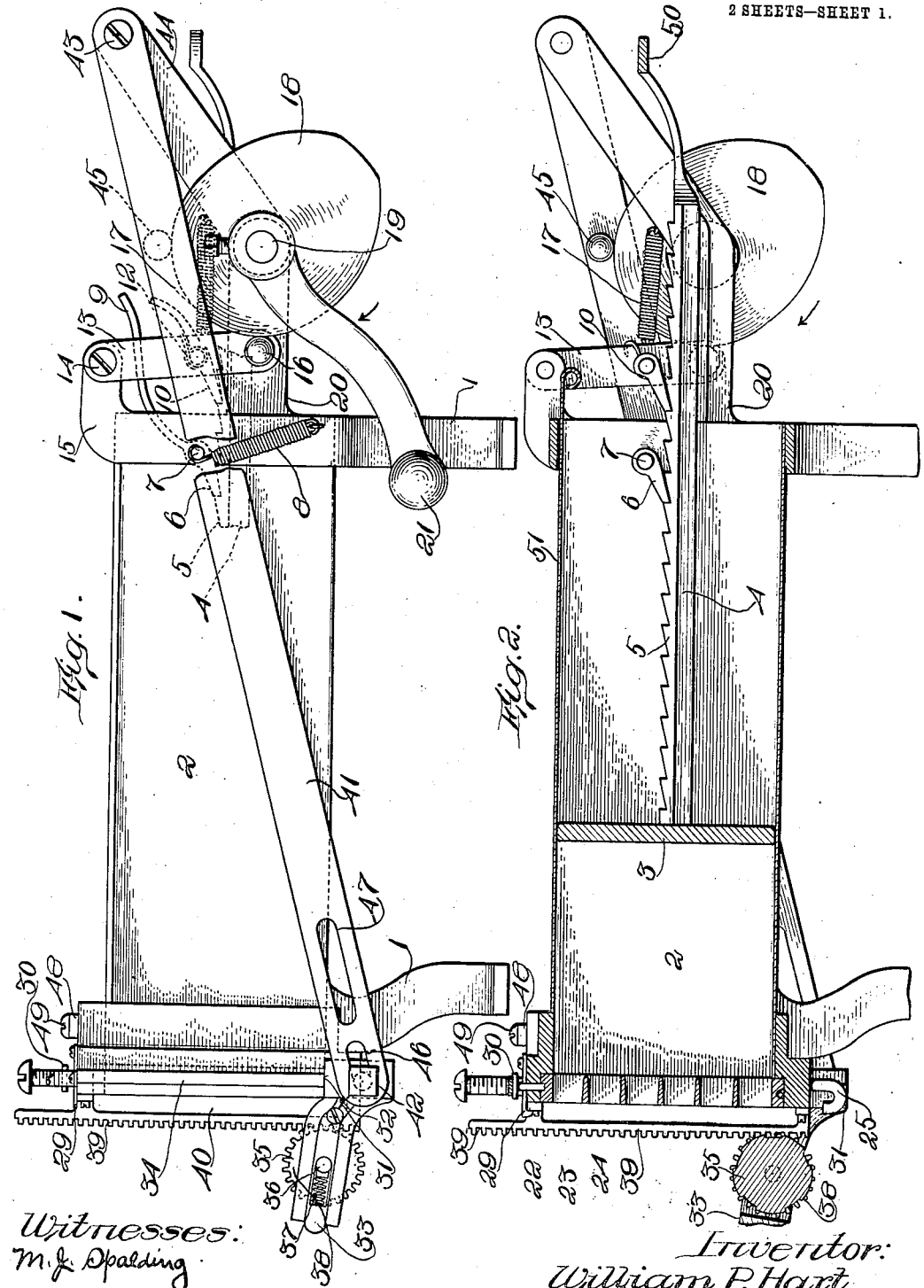

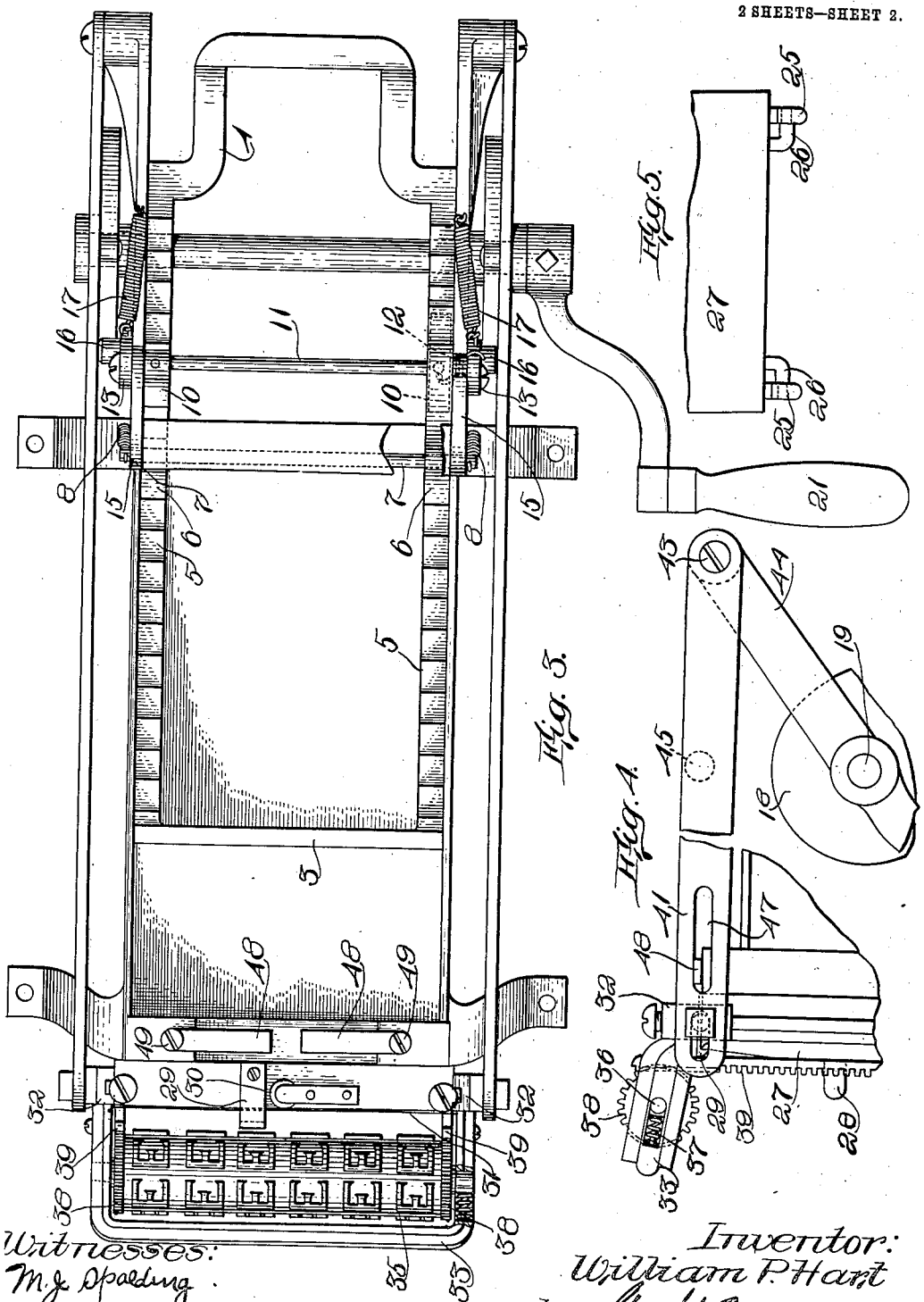

WILLIAM P. HART, OF BOSTON, MASSACHUSETTS, ASSIGNOR TO AUTOMATIC INDIVIDUAL BUTTER CUTTER COMPANY, A CORPORATION OF MAINE.

BUTTER-CUTTER.

958,639.          Specification of Letters Patent.      Patented May 17, 1910.

Application filed January 27, 1909, Serial No. 474,400. Renewed January 12, 1910. Serial No. 537,755.

*To all whom it may concern:*

Be it known that I, WILLIAM P. HART, a citizen of the United States, and resident of Boston, in the county of Suffolk and State of Massachusetts, have invented an Improvement in Butter-Cutters, of which the following description, in connection with the accompanying drawings, is a specification, like numerals on the drawings representing like parts.

My present invention has for its object the automatic formation in rapid succession of individual butter "prints," *i. e.* of the usual small cubes of butter adapted to individual table use.

My chief aim has been to provide simple and hygienic mechanism which will handle the butter neatly, cutting the individual cubes or small pieces of butter and preferably simultaneously printing them, all in such a manner as to avoid the possibility of mussing or injuring the neat appearance of the individual pieces of butter.

My machine is particularly adapted to take tub butter or other non-molded butter, molding the same into a large uniformly dense block, and then cut, without waste, small individual pieces, all of absolutely the same size, density, etc.

Another object had in view has been to devise a mechanism of few parts and in which each part is as nearly plane and smooth as possible so that it can be readily cleaned, *i. e.*, I have avoided gears and other forms of cavities and angular pieces as much as possible.

In the accompanying drawings I have illustrated a preferred embodiment of the invention.

Figure 1 shows the machine in side elevation, parts being broken away for clearness of illustration; Fig. 2 is a central vertical longitudinal section thereof; Fig. 3 shows the machine in top plan, partly broken away; Fig. 4 is a fragmentary view of the forward upper corner of the machine in side elevation, showing the relation of the parts before the cutting operation; and Fig. 5 is a detail of the door-closing device in front elevation.

Mounted on suitable standards or legs 1 is a box-like butter holder 2, herein shown as rectangular in cross section, within which is mounted a plunger 3 which serves to press the butter forward, being propelled by a frame 4 which, for free and certain propelling movement engages the plunger 3 at its extreme lateral ends, the two side members of said frame being provided with ratchets 5 each notch of which is preferably the width of a piece of butter (usually a half inch). Coöperating with these ratchets are dogs 6 fast on a shaft 7 journaled in the frame of the machine and normally held in locking position by springs 8, one of said dogs preferably having a rearwardly extending thumb piece or handle 9. A second pair of dogs 10 fast on a shaft 11 and normally held under locking tendency by a spring 12 is mounted in arms or links 13 pivoted at 14 to brackets 15 at the opposite sides of the machine, said arms or links being provided at their lower ends with rolls 16 and normally held back by springs 17 in engagement with the edge of actuating cams 18. The cams 18 are fast on a shaft 19 journaled in brackets 20 at the rear end of the machine, said shaft 19 being actuated by any suitable means as by a handle 21.

From the foregoing description it will be obvious that upon rotating the cam 18 in the direction of the arrow, the links 13 are swung back and forth so that the dogs 10 are caused thereby to move forward the ratchets 5 with each forward swing of said links, the dogs clicking behind the successive notches of the racks 5 at the end of each forward movement of said ratchets so as to retain all the forward impulse which has been transmitted to said ratchets and hence to the plunger 3 by the forward movement of the dogs 10. While the dogs 6 thus hold the ratchets 5 and plunger 3 and prevent any possibility of rebound or backward movement which might otherwise be caused by the slight resiliency which I have found is always present in the butter, the spring 17 and cam 18 have coöperated to move the links 13 and their dogs 10 back another notch into pushing engagement with the racks 5 again, whereupon the continued rotation of the cams 18 repeats the operation. In the front of the machine I mount a die or cutter frame 22, provided with horizontal and vertical cutter bars 23, 24 having rear knife edges for severing the block of butter into longitudinal columns as it is pushed forward by the pusher or plunger 3. On the lower front end of the frame of the machine I provide holding hooks or sockets 25 for receiving the trunnions 26 of a door 27 shown in Fig. 5 as having a handle 28 by which it is swung upwardly on its trunnions 26 like a hinge and caught beneath a latch or other holding device 29.

The frame 22 is held in place by any suitable means as a spring-held plunger 30. In starting the machine it is necessary to put the door 27 in place to serve as an abutment for halting the butter in its forward progress so that the plunger 3 may be permitted to compress and solidify the mass of butter ahead of it into a homogeneous dense block. Having thus condensed or rendered homogeneous the mass of butter, the door 27 is removed so as to permit the cutting to take place. This is effected by a wire 31 secured at its opposite ends to sliding members 32 of a yoke 33 which extends across the front of the machine. The sliding members 32 slide on vertical guides 34 so that the cutting wire 31 is thereby caused to travel in a truly vertical path in approximate contact with the face of the machine and across the front edges of the knives 23, 24, the cutting being performed on the upward movement so that the pieces of butter drop away into a receptacle as they are cut instead of all dropping in a body, as would be the case if the cutting were downward. The yoke 33 also carries a print roll 35 whose axle or trunnions 36 are held yieldingly by springs 37 to permit said print roll to have a yielding pressure against the butter, said roll being preferably given positive rotation by the engagement of its pinions 38 with the opposite vertical racks 39 secured to the machine, said racks being held forward so as to provide a space 40 at the rear for the vertical movement of the cutting wire behind the print roll. The print roll is preferably so positioned that it presses against the butter just before the latter is cut by the wire, and hence the pressure of the print roll against the butter has no tendency to interfere in any way with the neat, clean severing of the individual butter pieces.

The vertical movements of the cutting and printing mechanism are accomplished by long levers 41 at the opposite sides of the machine, pivoted at 42 to the slides 32 and at 43 to arms 44 extending from the rear end of the machine and herein shown as constituting continuations of the brackets 20. Said levers 41 are provided with rolls 45 in position to be engaged by the cams 18 as the latter rotate. The pivots 42 slide in longitudinal slots 46 formed in the front ends of the levers 41, and adjacent said front ends are other slots 47 in said levers for receiving holding devices 48 pivoted at 49 on the head of the machine, said devices 48 being turned on their pivots into engagement with said levers 41 whenever it is desired to maintain the latter in raised position as shown in Fig. 4. The levers 44 are mounted in position as shown above the cams 18 and connected as described, so that when suspended on the holding fingers or arms 48 they will be clear of the cams 18 and will not interfere with the independent operation of said cams for the purpose of compressing the butter.

Fig. 4 shows the parts in position for beginning the use of the machine, viz. for compressing the butter into a solid homogeneous block ready to be cut, and Figs. 1 and 2 show the machine ready to cut off the individual butter pieces after the mass of butter has first been thus condensed. After the machine has been operated sufficiently and it is desired to fill it again, the plunger or pusher 3 is pulled back to its starting position by means of a handle 50 which connects at the rear the two ratchets 5, 5, the dogs 6 and 10 being caused to release their engagement with said racks by depressing the tail piece or handle 9 of the dog 6 which engages the correspondingly projecting tail or handle of the dog 10 directly beneath the same, so that as a result both sets of dogs are disengaged from the ratchet. The apparatus is provided with a slide cover 51 adapted to be pulled rearward so as to open the box 2.

In use, the plunger 3 is first moved back to the rear by depressing the handle 9 sufficiently to disengage both sets of pawls from the ratchet 5 and then the desired amount of butter is packed into the machine in front of the plunger, the cover 51 is closed, the door 27 is put in place at the front of the machine, the yoke, cutting wire, and print roll being first raised and locked in suspended position as shown in Fig. 4, and then the operator quickly compresses the butter into a solid, dense, homogeneous block by a few turns of the handle 27. No rebound of the butter is possible because of the two sets of dogs 6, 10. Having properly condensed the butter into a solid block, the door 27 is removed, the suspending arms 48 are turned on their pivots 49 out of engagement with the levers 41 so as to permit the cam rolls 45 thereof again to engage the cams 18, and thereupon rotation of said cams causes the cutting wire 31, preceded by the print roll 35, to rise and fall alternately with the forward pressing movements of the butter, printing and cutting a series of individual pieces of butter at each upward movement.

The parts are so constructed that the downward movement of the wire 31 and roll 35 is instantaneous, whereas the upward movement is comparatively slow, and the pushing or forward feeding of the butter is accomplished after the wire and roll fall, the latter being at rest a sufficient length of time to permit the forward feeding of the pusher and ratchet one notch.

It will be evident to those skilled in the art that my invention is capable of a considerable range of variations in mechanical details, and accordingly I do not limit the same otherwise than as hereinafter expressed in the claims.

Having described my invention, what I claim as new and desire to secure by Letters Patent is, 1. A butter cutter, comprising means for compacting a mass of butter into a solid block to be cut, cutting means for cutting a plurality of individual pieces from one end of said block, a single actuating mechanism common to both of said means, actuating connections from said mechanism to said compacting means and to said cutting means said cutting means being movable into inoperative position out of actuated relation to said actuating mechanism when it is desired to actuate the compacting means said movement of the cutting means disconnecting its said actuating connection from operative relation with said common actuating mechanism.

2. In a butter cutter, means for sub-dividing a block of butter into a series of columns at one end, means for transversely severing the ends of said columns to form a plurality of individual butter pieces, and positively-acting printing means operating just ahead of said transverse severing action, for positively impressing the end of each column separately with an individual print.

3. In a butter cutter, means for sub-dividing a block of butter into a series of columns at one end, a transversely moving member at said end, a cutter carried by said member in position to sever individual butter pieces from the ends of said columns, and a print roll carried by said member just ahead of said cutter for impressing prints on the ends of the columns successively just before said severing thereof.

4. In a butter cutter, means for sub-dividing a block of butter into a series of columns at one end, a transversely moving member at said end, a cutter carried by said member in position to sever individual butter pieces from the ends of said columns, and a positively driven print roll carried by said member just ahead of said cutter for progressively impressing prints on the ends of the columns just before the progressive severing thereof.

5. In a butter cutter, a box-like butter holder for retaining a mass of butter to be compacted into a solid block and cut into individual pieces, compacting means, means for sub-dividing said block of butter into a series of parallel longitudinal columns projecting beyond said box-like holder, means for positively impressing the end of each of said parallel columns beyond said holder with a separate individual print, and cutting means for transversely severing the ends of said columns as they are impressed, thereby forming the desired plurality of individual butter pieces.

6. A butter cutter, comprising a butter receptacle, a grid-like severing frame in the forward end for sub-dividing the butter into longitudinal columns, a plunger for pushing the mass of butter forward toward said end and pushing mechanism including longitudinal ratchet mechanism extending rearwardly from said plunger, independent spring-actuated dogs, one ahead of the other, for engaging said ratchet mechanism, and means for reciprocating one of said dogs to push forward said plunger, the other dog serving to hold the plunger in its forward position when said actuating dog is being reciprocated backward, the forward dog having a rearwardly extending tail piece overhanging the rear dog in position to disengage the latter from the ratchet mechanism when the forward dog is similarly disengaged.

7. A butter cutter, comprising a butter receptacle, a grid-like severing frame in the forward end for sub-dividing the butter into longitudinal columns, a plunger for pushing the mass of butter forward toward said end, a cam shaft and cams at the rear end, a yoke provided with a transverse cutter for cutting off the front ends of the columns of butter, said yoke extending across the forward end of the machine and having rearwardly extending levers pivoted at the rear end of the machine in position to be engaged by said cams for causing said cutter to rise and fall, and step-by-step pushing mechanism actuated by said cams for pushing said plunger forward in the intervals between the cutting movements of said cutter.

8. A butter cutter, comprising a butter receptacle, a grid-like severing frame in the forward end for sub-dividing the butter into longitudinal columns, a plunger for pushing the mass of butter forward toward said end, a cam shaft and cams at the rear end, a yoke provided with a transverse cutter for cutting off the front ends of the columns of butter said yoke extending across the forward end of the machine and having rearwardly extending levers pivoted at the rear end of the machine in position to be engaged by said cams for causing said cutter to rise and fall, links pivoted to a fixed support at one end in position to be engaged by said cams to be swung forward after said levers have been actuated to move said cutter upward, and pawl and ratchet mechanism between said plunger and links actuated by the latter for moving the plunger forward.

9. A butter cutter, comprising a receptacle, cutting mechanism at the front end and actuating mechanism at the rear end, and a plunger within said receptacle for pushing the butter forward to be cut, said cutting mechanism including a stationary die for severing the butter into longitudinal columns, a vertically movable horizontal wire for cutting the columns transversely, opposite sliding members for holding said wire, vertical guides on which said members travel, levers for moving said members, extending rearwardly and pivoted at the rear end of the machine, a transverse shaft and cams thereon for engaging said levers to reciprocate said wire, vertically extending links pivoted to a fixed part of the machine at one end and actuated by said cams, ratchets extending rearwardly from said plunger, and dogs carried by said links to engage said ratchets for feeding the plunger forward.

10. A butter cutter, comprising a receptacle, cutting mechanism at the front end and actuating mechanism at the rear end, and a plunger within said receptacle for pushing the butter forward to be cut, said cutting mechanism including a stationary die for severing the butter into longitudinal columns, a vertically movable horizontal wire for cutting the columns transversely, the machine having vertical slots in which said wire travels, opposite sliding members for holding said wire, vertical guides on which said members travel, a transverse print roll carried by said members immediately in front and above said wire, levers for moving said members, extending rearwardly and pivoted at the rear end of the machine, a transverse shaft and cams thereon for engaging said levers to reciprocate said wire, vertically extending links pivoted to a fixed part of the machine at one end and actuated by said cams, ratchets extending rearwardly from said plunger, and dogs carried by said links to engage said ratchets for feeding the plunger forward.

11. A butter cutter, comprising a receptacle, cutting mechanism at the front end and actuating mechanism at the rear end, and a plunger within said receptacle for pushing the butter forward to be cut, said cutting mechanism including a stationary die for severing the butter into longitudinal columns, a vertically movable horizontal wire for cutting the columns transversely, the machine having vertical slots in which said wire travels, opposite sliding members for holding said wire, vertical guides on which said members travel, a transverse print roll carried by said members immediately in front and above said wire, a toothed pinion on said roll, a stationary rack bar in front of said slots for actuating said pinion as the roll is vertically reciprocated, levers for moving said members, extending rearwardly and pivoted at the rear end of the machine, a transverse shaft and cams thereon for engaging said levers to reciprocate said wire, vertically extending links pivoted to a fixed part of the machine at one end and actuated by said cams, ratchets extending rearwardly from said plunger, and dogs carried by said links to engage said ratchets for feeding the plunger forward.

In testimony whereof, I have signed my name to this specification, in the presence of two subscribing witnesses.

WILLIAM P. HART.

Witnesses:
EDWARD MAXWELL,
M. J. SPALDING.